United States Patent [19]

Holbrook et al.

[11] 4,365,619

[45] Dec. 28, 1982

[54] SOLAR ENERGY SYSTEM FOR HEATING AND COOLING OF BUILDINGS UTILIZING MOIST AIR CYCLES

[76] Inventors: Edward M. Holbrook, 1012 Charity Dr., Virginia Beach, Va. 23455; Joseph J. Wallace, 1212 King Arthur Dr., Chesapeake, Va. 23323

[21] Appl. No.: 77,907

[22] Filed: Sep. 24, 1979

Related U.S. Application Data

[62] Division of Ser. No. 878,510, Feb. 17, 1978, Pat. No. 4,182,406.

[51] Int. Cl.³ .............................................. F24J 3/02
[52] U.S. Cl. .................................. 126/428; 126/433; 126/437; 261/151
[58] Field of Search ............... 126/428, 433, 435, 437; 261/151, 152

[56] References Cited

U.S. PATENT DOCUMENTS

| | | | |
|---|---|---|---|
| 3,369,541 | 2/1968 | Thomason | 126/431 X |
| 3,894,528 | 7/1975 | Stubblefield | 261/151 X |
| 4,029,082 | 6/1977 | Thomason et al. | 126/430 |
| 4,081,024 | 3/1978 | Rush et al. | 126/436 X |

Primary Examiner—Samuel Scott
Assistant Examiner—Margaret A. Focarino
Attorney, Agent, or Firm—William F. Frank

[57] ABSTRACT

An integrated system for the collection, storage, and utilization of solar energy in the heating and cooling of buildings utilizing a moist air cycle involving evaporation and condensation of water vapor at constant pressure to obtain the advantages of high heat capacity, resulting from phase change, and low mass flow rate. Supersaturated moist air is circulated through solar collectors where evaporation takes place; the coolant leaving the solar collectors in a saturated condition and returning to a hot storage tank. There the coolant flows across the surface of hot stored water where condensation takes place, and thereafter leaves the hot storage tank in a saturated condition and at a temperature only slightly above that of the stored water. The hot storage tank further includes floating heat exchanger means for heating water in the portable water supply system. Upon leaving the hot storage tank the coolant is passed through a novel humidifying device which restores exactly the amount of moisture that was lost by condensation. This device withdraws water from the hot storage tank by means of a pump and introduces the water into the moist air stream in the form of a fog and very fine mist by the process of high pressure atomization. The supersaturated mixture is then returned to the solar collectors to repeat the cycle. Suitable controls modulate both the air and water flow rates in response to the rate at which solar energy is being collected.

2 Claims, 8 Drawing Figures

SOLAR ENERGY SYSTEM FOR HEATING AND COOLING OF BUILDINGS UTILIZING MOIST AIR CYCLES

This is a division of application Ser. No. 878,510 filed Feb. 17, 1978, now U.S. Pat. No. 4,182,406.

BACKGROUND OF THE INVENTION

1. Field of the Invention

The present invention relates generally to a system for collection and absorption of solar energy and transfer of the resulting thermal energy to a heat transport medium for use in the heating and cooling of buildings as well as domestic hot water, and more particularly to a system of this type utilizing flat plate type solar energy collectors wherein moist air flowing therethrough absorbs solar energy which is subsequently transferred to thermal energy storage means for later utilization.

2. Prior Art

Various solar energy systems and sub-systems presently available generally fall into two broad categories, i.e., active systems and passive systems. The active systems heretofore known utilize either air or a liquid, such as water, as the collector coolant and heat transfer fluid.

Such air systems generally utilize flat plate type solar energy collectors mounted on the roofs or walls of a building and may or may not use storage means such as a massive bed of rocks or pebbles, or eutectic salts in sealed containers occupying much less space but which have been found to have certain limitations and drawbacks. Some of such air systems have been designed and built utilizing hot building cavities, such as attics and walls, instead of flat plate collectors, but these are more inefficient than the ones utilizing collectors.

Such liquid systems, usually utilizing water or a water/glycol mixture, have included flat plate or concentrating solar energy type collectors. Energy storage, if used, has usually included the provision of a sealed and insulated tank, unless the system is designed for draindown, in which case the tank provided is vented and at atmospheric pressure.

None of the system known to applicants utilize moist air as the heat transfer fluid or the principal of evaporation and condensation (phase change) to enhance heat transfer and reduce mass flow rate.

Certain disadvantages of prior art systems mentioned hereinbefore eliminated or obviated by the present include high initial cost, low efficiencies for heat collection and heat transfer; bulky heat storage devices; the necessity of providing low temperature freeze protection such as drain down or antifreeze; the necessity of providing high temperature protection means such as heat dump coils and fans; the provision of overpressure or underpressure protection means such as expansion tanks, relief valves and vacuum breakers; separate equipment for heat dissipation, such as cooling towers, wells, city water or air cooled refrigerant condensers; the use of fluids that cannot be mixed and which depend upon intervening heat transfer devices such as shell and tube heat exchangers submerged coils, and finned tube devices, all of which require a thermal potential ($\Delta T$) and thus a higher temperature source to accomplish the desired result; multiple fans and pumps with their attendant high first cost and maintenance cost; complex and expensive control systems; the inability to provide both heating and cooling from a solar energy source; and lack of flexibility in being adaptable to either residential or commercial buildings and to either new construction or retrofit projects.

SUMMARY OF THE INVENTION

This invention eliminates or greatly reduces the foregoing disadvantages associated with the prior art, pertaining to the collection, storage and utilization of solar energy. The heat transport and storage fluids utilized therewith are efficient, compatible, safe, economical and non-corrosive. The solar sub-systems and controls incorporated therein are designed to obtain the maximum performance from the thermodynamic cycle of evaporation and condensation (phase change).

A preferred embodiment of the system according to the present invention includes a field of south facing solar collectors mounted on a building roof and tilted from the horizontal at an angle that will provide maximum solar gain during the month that the load demand is highest. The solar collectors are connected to the thermal storage tanks by a suitable system of supply and return ducts, equipped with circulating fan, dampers, fogging device and controls for directing and modulating fluid flow in accordance with collector output. Two or more thermal storage tanks, each equipped with an integral, direct contact type heat exchanger, extract and store the transported energy. Conversely, the solar system may be utilized at night to dissipate heat from one tank and thus provide a heat sink for air conditioning equipment. The flexibility and economic advantage of double purpose usage is obvious for buildings that require both heating and cooling.

The solar collectors utilize light weight, low cost materials and may be constructed and installed as modular units (panels), or as a continuous field, and are readily adaptable to retrofit installation. A solar collector in panel form includes louvered, absorber screens arranged in the form of a wedge, enclosed within a light weight, insulated frame and covered by one or more highly transmitting, moisture proof sheets of glazing material. The absorber screens are preferrably, formed of a non-ferrous metal such as aluminum or copper, and are coated on all surfaces with high temperature flat black enamel. The outer weather proof glazing sheet is low iron, tempered glass or acrylic plastic sheet, such as lucite or pleziglass. The inner glazing sheet consists of a 4 to 7 mil thickness of tedlar or FEP plastic film stretched and sealed around all edges.

The solar collectors are mounted on a partioned sub-frame that forms supply and return air plenums for the collectors.

In operation, a supersaturated mixture of moist air and free water (in the form of a fog) is metered through slots or holes, communicating with the supply plenum, into the space between the screens at the bottom of the solar collector. From there the flow proceeds upwards and outward through the louvered screens, diminishing to zero between the screens at the top of the solar collector. The merging flows combine at the top of the solar collector and exit through slots or holes to the return plenum beneath. The many fine louvers in the screens provide intimate contact of the fluid mixture with the hot absorber surfaces, raising the temperature of the fluid and evaporating the free water such that it leaves in a saturated condition. Thermal balance is maintained by a humidistat sensing leaving air conditions to modulate the water fog feed rate in accordance with collector heat output. A differential temperature controller with one element in hot storage and the other in the solar air return duct modulates the air flow rate (volumn damper) to maintain solar air return temperature above tank temperature.

Upon leaving the solar collector, the hot saturated air is conducted through the return duct and circulating fan to the top inlet of the hot storage tank. A flexible connection at this point is connected to the tank heat exchanger float such that the flow must pass beneath the float and across the top surface of the water within the tank. The restricted air passage brings the saturated air into intimate contact with the cooler water where cooling and condensation takes place. Motion of the air across the surface of the water creates turbulence and water currents that prevent stratification within the tank, and aid the heat exchange process. The cooled, moist air exits around the perimeter of the float, through the supply air plenums in the top of the tank, to the supply air duct connection.

The tanks are insulated on the top, bottom and sides for efficient storage of thermal energy. Piping connections through the top of the tank permit fill, drain and overflow, in addition to circulation of water to utilize equipment. The tanks operate at very near atmospheric pressure and at temperatures of 212° and below, thus requiring no safeties and no minimum structural strength. All excess heat received from the solar collectors is dissipated by boiling off an equivalent amount of water. Since the tanks are the low point in the solar system any excess water or condensation in the system drains back into the system tanks.

Upon leaving the tank the cooled moist air is passed through the fog nozzle assembly to restore the moisture lost by condensation. This device contains an inlet nozzle to accelerate the air flow entering the mixing chamber. Water spray nozzles located around the perimeter of the chamber are fed from a flow control valve and high pressure pump, taking suction from the hot storage tank. The discharge from the nozzles is in the form of an aerosol, or, very fine mist and fog, and is directed into the turbulent air stream leaving the inlet nozzle. The humidistat, previously mentioned, is in command of the actuator that positions the control valve to determine how many spray nozzles are active. Any excess water at this point drains back to the tank through the ball front valve at the bottom of the mixing chamber.

The supersaturated fluid mixture leaving the mixing chamber is conveyed by the supply duct system to the collector supply plenum, or plenums, to begin a new cycle.

Night time cooling is obtained by re-positioning of ductwork dampers to permit the fan to draw in cool, dry outside air, instead of solar return air, and conduct it to the second (cold) tank. In passing beneath the heat exchanger float the air absorbs moisture from the water by evaporation thus lowering the water temperature. As in the heating mode, the moist air is returned to the solar collectors through the fog nozzle assembly but with the water pump "off" so that no moisture is added. In passing through the collector the warm moist air is cooled by radiation and convection, and a portion of the water vapor is condensed and drains back through the duct system to the cold tank. Upon leaving the collectors the air is exhausted to the outside, rather than recirculated.

An important adjunct of this system is the provision for domestic water heating. A submerged surge tank within the hot storage tank provides a reserve of preheated domestic hot water. The tank outlet is connected to a spiraled tube reheat coil on the bottom surface of the heat exchanger float. The reheat coil is connected to the conventional domestic hot water heater (back-up system). Upon a demand for hot water, the solar heat water flows through the domestic water heater where any deficiency in supply temperature is added. Because of the simplicity of this flow circuit no pumps, controls, or special valves are required.

The solar system of this invention is readily adaptable to conventional hydronic, air-hydronic and all air heating/cooling systems. The hot water may be circulated directly through building heating elements such as finned radiation or hot water coils. It may also be circulated directly through absorption type cooling units, temperature permitting, for air conditioning service. In the preferred arrangement the hot and cold water is circulated through a conventional water heat pump to provide either heating or cooling. In this application the effectiveness of the storage system is increased because of the wide range of temperatures that may be accepted by the heat pump (50° F. to 100° F.). By the use of a temperature valve (water regulator) the hot tank temperature range may be increased to 50° F. to 200° F.

In general, the objectives of this invention are to provide a more efficient and a more economical method of collection, storage and utilization of solar energy for heating and cooling of buildings.

DETAILED DESCRIPTION OF THE INVENTION

Figure 1:
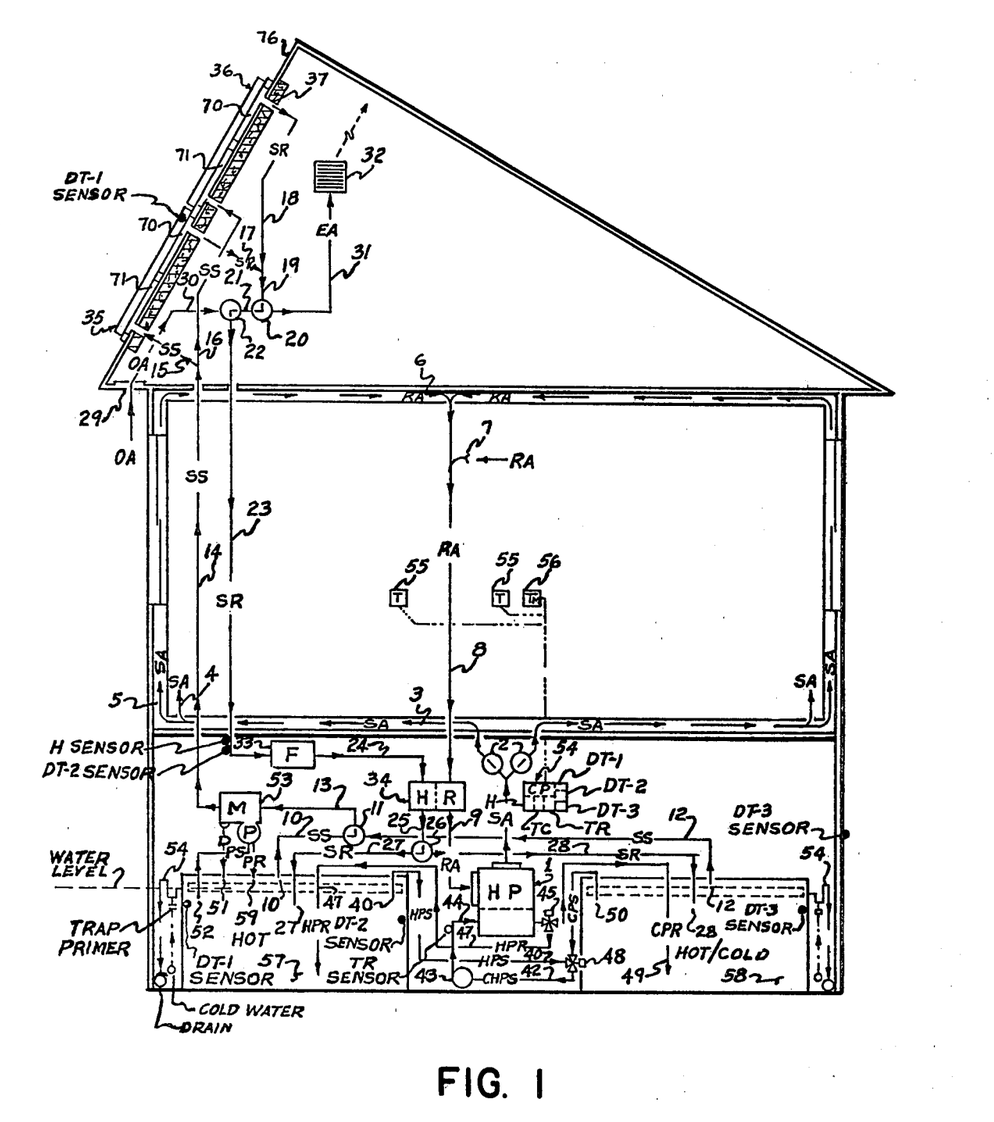
FIG. 1 is a somewhat schematic elevational view of the solar system and a building system utilizing a heat pump for a bilding heating/cooling unit, and is shown as it may be applied to a small building such as a residence.

Referring now more particularly to the drawings, wherein like reference numerals designate the same or similar parts throughout the several views, and more specifically to FIG. 1 there is depicted the system according to the present invention as small building, such as a residence, and used in conjunction with the building heating/cooling system incorporating the water source heat pump unit designated by the reference numeral 1. The solar energy collection sub-system employed includes the solar collection array, 35 and 36, as shown in FIG. 1, and further shown in FIGS. 2-4, as more fully set forth hereinafter. The solar fan 33, dampers 11 and 26; duct system components 10, 12-19, 21, 23, 24, 25, 27 and 28; the fog nozzle pump assembly 53; the storage tank/heat exchanger assemblies 57 and 58; and the system controls 54 are also included in such solar energy collection subsystem.

The building heating/cooling system includes the water source heat pump unit 1, an optional heat recovery unit 34 (heat pipe), master thermostat 56, zone thermostats 55, zone dampers 2, control relays and time clock TC, control dampers 20 and 22, conditioned air distribution system 3 thru 9, condenser water cooling auxiliary system 29 thru 32 and the outdoor coil piping, pump, and valve system 40 and 42 through 50 all as shown in FIG. 1 and described hereinafter.

To place heat into storage, a defferential temperature controller DT-1, located in control panel 54, senses the condition when absorber screen 63 temperature exceeds that of the stored hot water in the tank 57 and starts the solar fan 33 and the water spray pump motor 81 of fog nozzle pump assembly 53, placing the solar system in operation.

For the heating mode of operation, control dampers 11 and 26 are positioned to direct flow to and from the hot storage tank 57 while control dampers 20 and 22 are positioned to recycle solar air return (SR), rather than introduce outside air through duct 30 and exhaust return air through duct 31. In this mode, solar fan 33 draws hot moist air from the solar air return plenum 70 at the top of the solar collector panel array 35 and 36. The hot moist air flows through branch ducts 17 and 18 to solar return ducts 19, 21 and 23 to the fan 33, thence through duct 24 to the heat pipe 34 (if used) where heat is extracted and transferred to the house return air duct 8. The surplus heat (or all of the heat if the heat pipe is not used) is transported by the hot moist air flowing through ducts 25 and 27 to the bottom surface of the heat exchanger float 90, located in the hot storage tank 57, as shown in FIG. 8.

Figure 8:
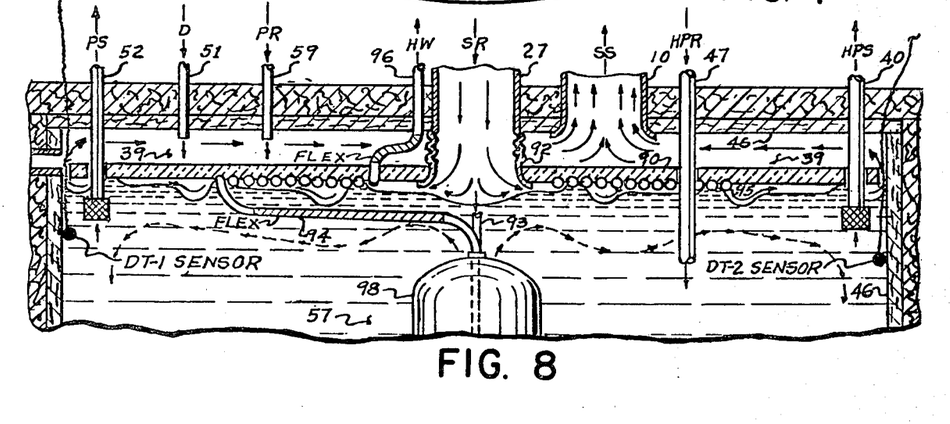

Referring now more particularly to FIG. 8, it will be seen that the hot moist air enters the heat exchanger through a flexible connection 92, including accordian type pleats which is designed to allow the heat exchanger float 90 to rise and fall with changes in water level in tank 57 while maintaining a constant back pressure on the solat fan 33. The air flow is evenly distributed in an outward radial direction and the dynamic forces of the flow process cause a rippling effect on the surface of the stored water. The hot saturated moist air flowing between the bottom surface of the heat exchanger float 90 and its domestic hot water coils 95 and the top surface of the stored hot water is cooled below its dewpoint, resulting in condensation of a portion of its water vapor as well as sensible cooling of the air fraction. This cooling and condensation results in the transfer of heat from the moist air to its surroundings. The moist air escapes around the outer edges of the heat exchanger float to 90 the supply air plenum 39 above, at a lower temperature and enthalpy than at which it entered, but at a saturated condition.

Figure 5:
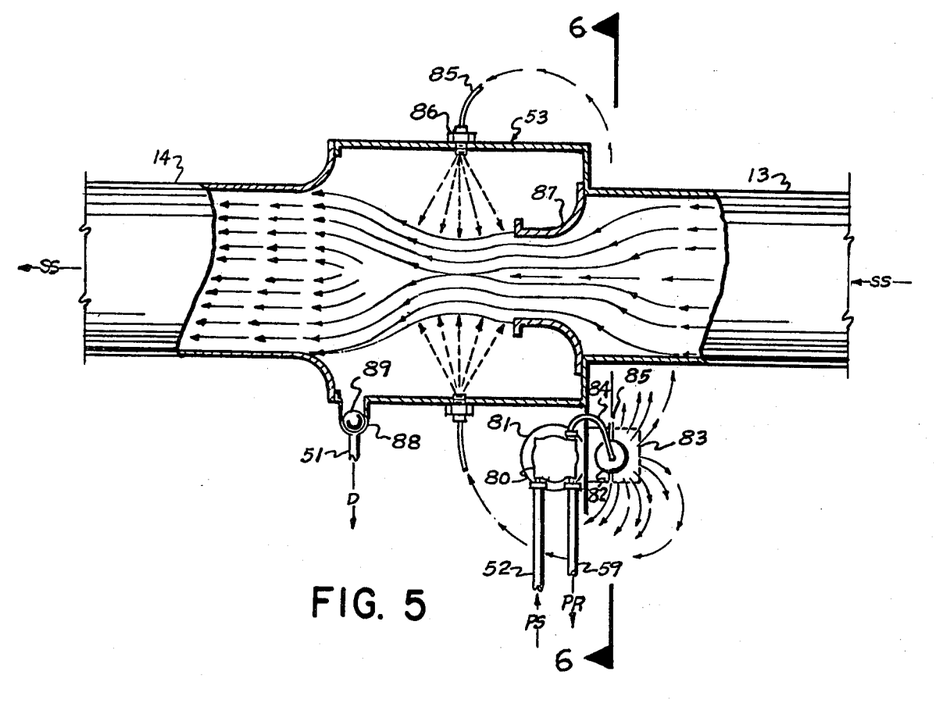
FIG. 5 is a detailed sectional view of a fog nozzle spray pump assembly incorporated in the systems according to the instant inventions, showing the air and water flow patterns within the mixing chamber thereof and the preferred arrangement of components.
Figure 6:
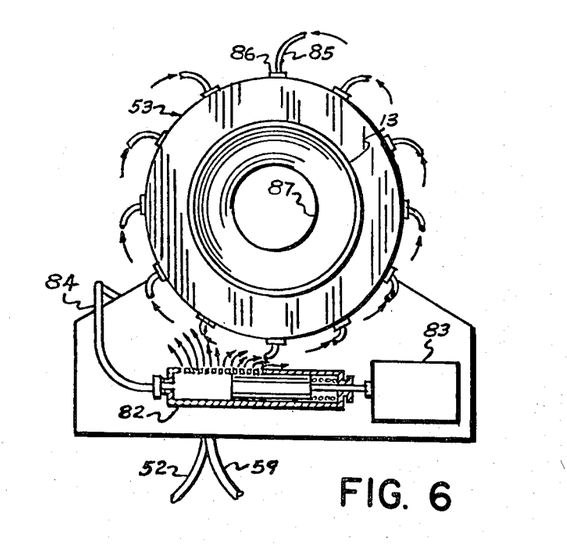
FIG. 6 is a sectional view through the inlet of the assembly depicted in FIG. 5 and through the spray nozzle control valve thereof.
Figure 7:
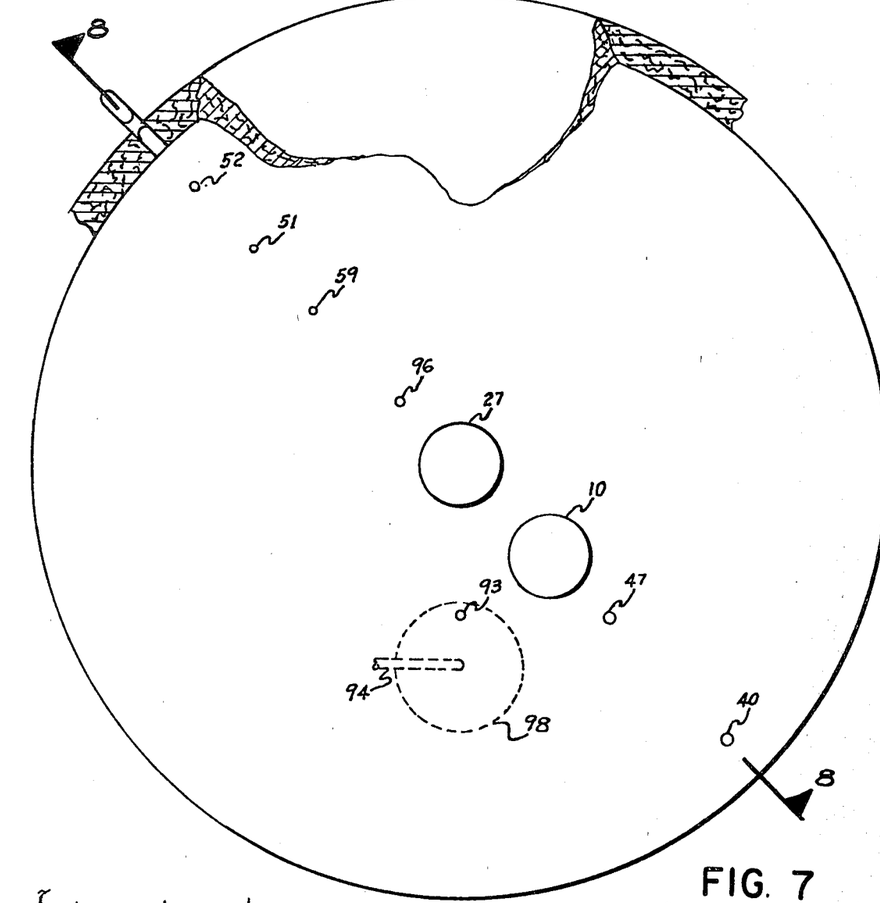
FIG. 7 is a plan view of a storage tank incorporated in the systems according to the present invention indicating the required piping and duct connections, including those required for a domestic water heater surge tank; and, FIG. 8 is a sectional elevational view of the storage tank depicted in FIG. 7 showing in some detail such piping and duct connections and further showing a heat exchanger float, situated therein carrying surface mounted domestic hot water heating coils operationally connected to such domestic water surge tank.

The moist air flows out through solar supply (SS) ducts 10 and 13 to the fog nozzle-spray pump assembly 53 shown in FIGS. 5 and 6. There the moist air enters the mixing chamber of the assembly 53 through a flow nozzle 87 which accelerates the flow to a high velocity. The high velocity, turbulent flow exciting the flow nozzle 87, further contracts, creating a low pressure zone within the mixing chamber at the most restricted portion of the stream. It is at this zone that the water spray is directed for most effective mixing. The water spray nozzles 86, located around the periphery of the mixing chamber are the high pressure, atomizing type and are individually fed by flow tubes 85 from the flow control valve 82. Since the process is essentially adiabatic, the flow leaving the mixing chamber is a mixture of saturated air and liquid water in the form of a fog (aerosol) or a very fine mist and might be termed supersaturated air. The larger droplets of water are centrifuged out of the air stream within the mixing chamber to the walls thereof and accumulate in the moisture trap 38 at the bottom of the chamber. When a sufficient amount of water has accumulated in the trap, its ball float 89 is lifted from its seat and the excess water is drained through tube 51 back to the storage tank 57 from whence it came.

To augment and control this process of moisturizing, spray pump 80 is in operation taking suction from below the water level in storage tank 57 through its suction tube 52 and is returning the excess water to storage tank 57 through its return tube 59. The pressurized water is delivered to the spray control valve 82 through pressure tube 84. The spray control valve 82 is designed with multipke discharge ports which can be closed off in sequence by its sliding piston. A humidistat H (FIG. 1) sensing solar air return humidity is in control of the valve motor 83, (FIGS. 5 and 6) in a modulating manner, to command the device to open only a sufficient number of ports to maintain a saturated condition in the solar air return duct (SR). Thus only the amount of moisture needed to satisfy the evaporation rate occurring within the solar collectors is delivered to the solar air supply (SS).

The solar air supply (SS) leaving the fog nozzle-spray pump assembly 53 is delivered through ducts 14 and 16 to the solar air supply plenums 71 located beneath the solar panel array 35 and 36. The supersaturated moist air thus entering the supply plenums through supply slots 66. The coolant mixture thus delivered flows between the upper absorber screen 63 and the lower absorber screen 64, escaping outwardly through the many fine louvers in both screens and thence flows upwardly to the top of the panel to the return slots 65. The intimate contact and impingement of the coolant with the hot absorber surfaces, enhanced by the many fine louvers, results in a high co-efficient of heat transfer. The excess water transported by the mixture in the form of a fog or mist is vaporized in the heating process which results in an increase in the thermodynamic wet bulb temperature of the mixture (increase in enthalphy). The mixture thus leaves the solar collector panels 35 and 36 with a higher heat content than existed upon entering. Upon leaving the panels the hot saturated moist air mixture enters the solar air plemums 70 thus completing the cycle.

Figure 2:
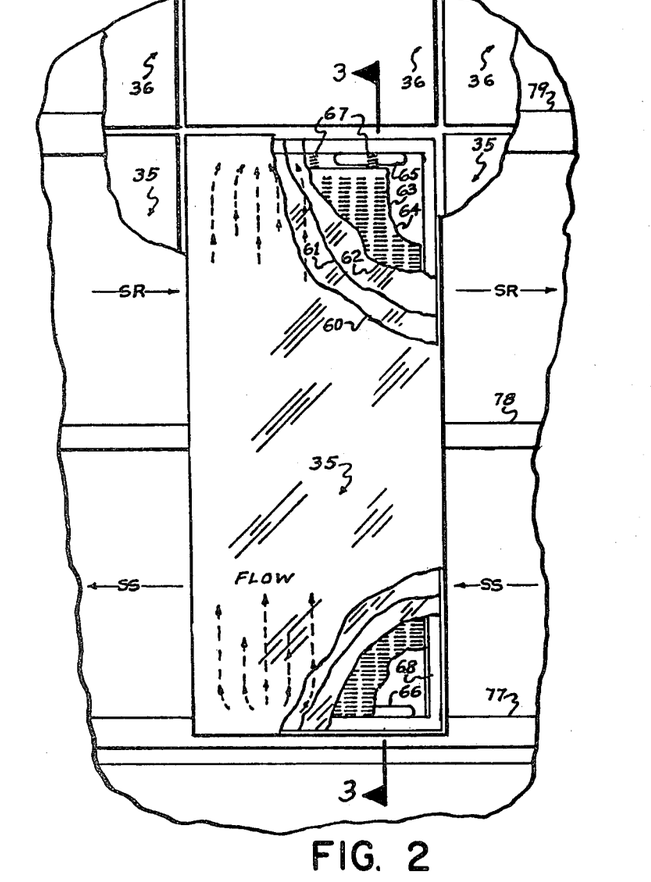
FIG. 2 is a plan view of a solar collector panel, with parts broken away for the purpose of illustration, shown as it may be installed in a array of solar collector panels mounted on a building roof.
Figure 3:
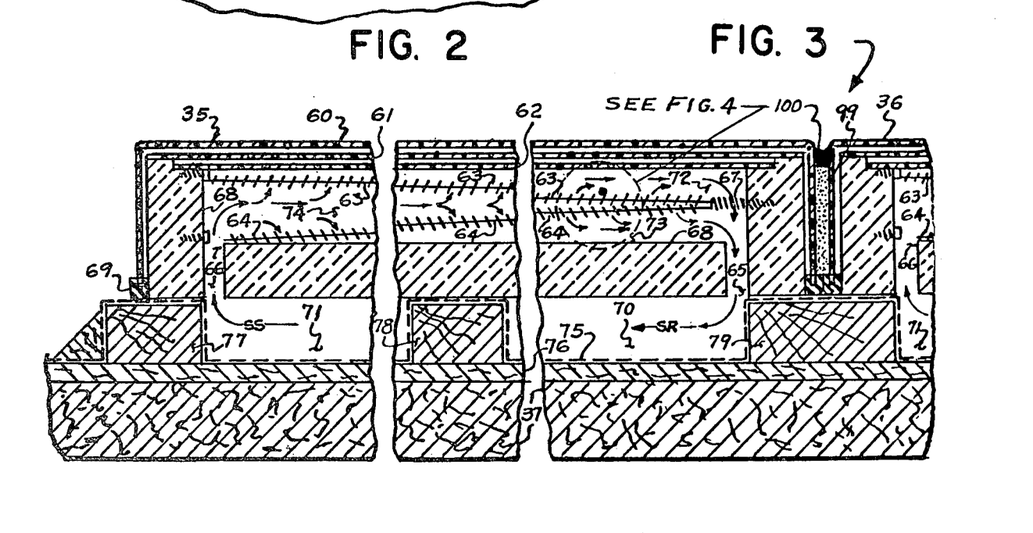
FIG. 3 is a longitudinal, sectional view of the solar collector panel shown in FIG. 2 taken on the line 3—3 of FIG. 2, showing the preferred arrangement of panel components and the air flow paths, including those of supply and return air plenums.
Figure 4:
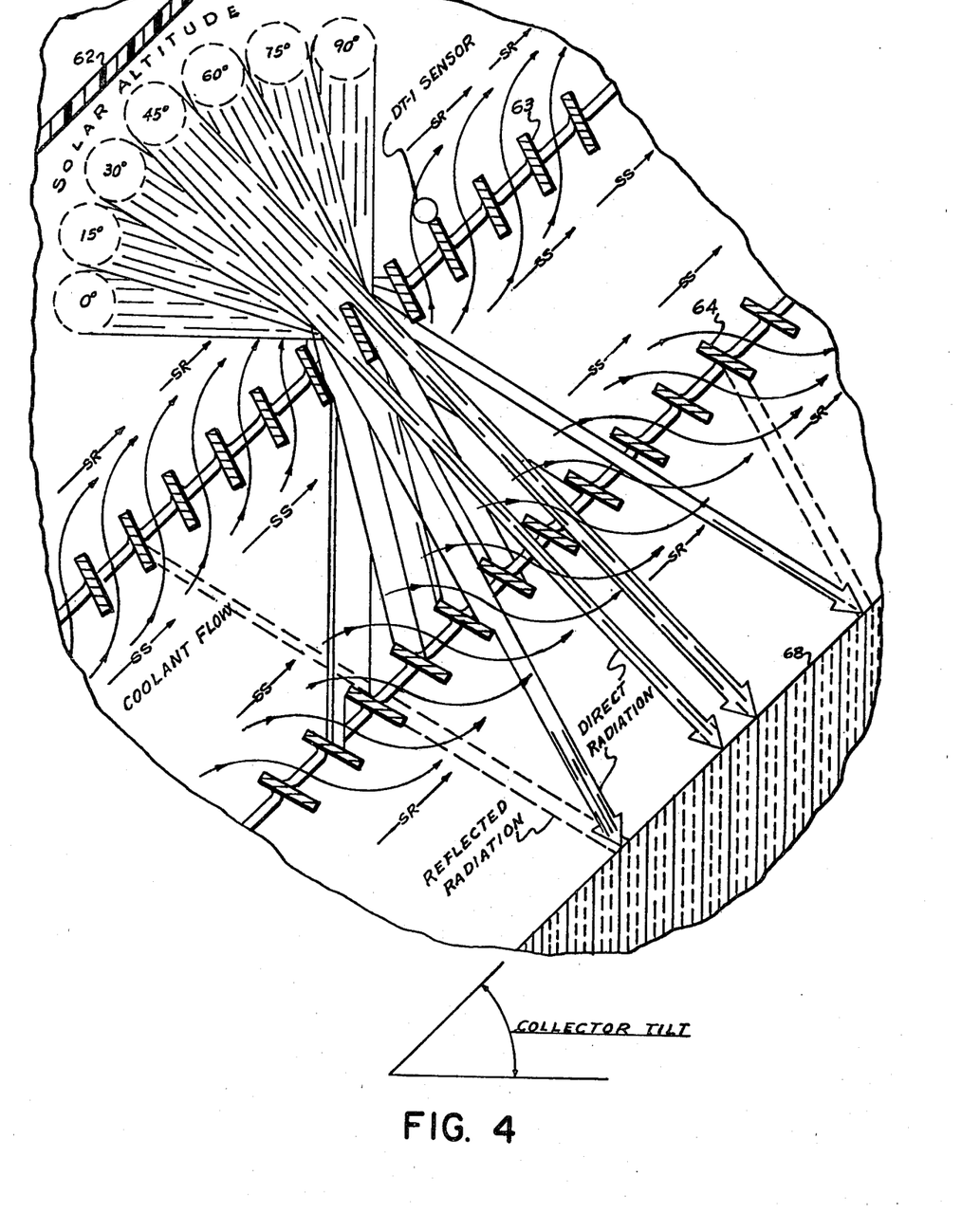
FIG. 4 is a partial sectional view on an enlarged scale of absorber screens, components of such solar collector panel indicating the coolant flow paths through the screen components and the intercept capabilities of such screen components for solar radiation arriving from various solar altitudes, when the collector panels are mounted at an arbitrary angle of 45° to the horizontal.

To protect the panel assembly and control heat losses the collectors are provided with an outer, rigid plastic cover 60 as shown in FIG. 2 and FIG. 3, with its bottom edges sealed to the supporting structure 77, 78 and 79 by soft rubber grommets 69. The interstices between panels are further sealed by foam rubber gaskets 99 which permit thermal expansion and contraction. An outer seal of non-hardening caulking compound 100 completes the weather proofing. Inner covers 61 and 62 of thin plastic sheets (tedlar) further reduce the heat losses from the panel without seriously reducing its solar transmittance.

The collector panel frame consists of a rigid foam plastic box 68 whose surfaces are covered by a reflective metal foil. The upper and lower panels (absorber) are very fine mesh louvered metal screens 63 and 64 whose bottom edges are secured to the bottom wall of the box 68, and whose upper edges are fastened to the top wall of the box 68 by tension springs 67 to maintain their geometry, while allowing for thermal expansion and contraction. The absorber screens are painted flat black with a high absorptive, moisture resistant paint.

Supporting members 77, 78 and 79 form the side and end enclosures of the supply and return air plenums with the bottom of the plenum formed by the conventional roof sheathing 76. These are completely covered by metallic water proof membrane 75 such as sisalkraft fo form moisture and air tight enclosures.

To further control operation and shutdown during the heating mode of operation, a second differential temperature controller DT-2 (FIG. 1) senses hot storage tank 57 temperature and the solar air return temperature and controls in a modulating manner the moist air flow rate to the solar collector panels to maintain solar air return temperature at a predetermined amount above hot storage tank temperature. This is of course necessary to obtain heat transfer from the hot saturated air to the stored hot water, which varies in temperature with the rate abd duration of the heat collection. This control is in command of either the solar air fan speed 33 or a duct mounted, motorized damper, not shown, to vary the coolant flow rate. In late afternoon or early evening when the heat gain of the solar collectors and the coolant flow rate have dropped to a predetermined minimum, either a photocell, not shown, or an air flow switch, not shown, will stop operation of the solar fan 33 and the water spray pump 80 and thus place the system in the "off" condition.

For the cooling mode of operation, a third differential temperature controller DT-3 (FIG. 1) will sense outdoor temperature and hot/cold storage tank 58 temperature and place the solar fan 33, but not the spray pump 80, in operation as the outside temperature drops below tank temperature. This control will be interlocked through a summer-winter switch, not shown, on the system control panel 54 and through a time clock TC (FIG. 1) with an astromonomical dial, to prevent operation when only heating is needed and when solar collection is possible during daylight.

The time clock TC, operating through the summer-winter switch, will position flow control dampers 11 and 26 to direct solar return (SR) through duct 28 to the hot/cold tank 58, and solar supply (SS) from the hot/cold tank 58 through ducts 12, 13, 14, 15 and 16 to the collector array. The clock will also position control damper 22 to receive outdoor air from louver 29 and duct 30 instead of solar return air (SR) from ducts 17, 18, 19 and 21 and will position control damper 20 to exhaust solar return air through ducts 17, 18, 19 and 31 to louver 32 rather than recycling the air. With the dampers thus positioned, the solar fan will draw air from the outdoor intake louver 29 through ducts 30 and 23 and discharge cool outdoor ait through ducts 24 and 28 to the heat exchanger float 90 (FIG. 8) located in hot/cold storage tank 58. In passing beneath the heat exchanger float 90 and the domestic hot water coils 95 and across the surface of the warm stored water, the air will absorb moisture, thus cooling the stored water, much the same as occurs in a cooling tower. The warm, moisture laden air is exhausted through ducts 12, 13, 14, 15 qnd 16 to the solar collector supply plenums 71 (FIG. 2 and FIG. 3). From there it passes through the supply slots 66 at the bottom of the collector panels, as in the heating mode, and is cooled by radiation and conduction heat losses, condensing some of the moisture. The air is thence exhausted through the return slots 65 to the return plenums 70, and through ducts 17, 18, 19 and 31 to the outdoor exhaust louver 32. This mode of operation is terminated automatically at a preset hour by the time clock TC, or by changing the setting of the summer-winter switch to winter, on the master thermostat 56 (FIG. 1).

The building structure heating/cooling system also has two modes of operation, namely, heating and cooling. In the heating mode, the master thermostat 56 is indexed to heating placing the heat pump unit 1 in a mode to extract heat from the circulating water. When indexed to heat, control panel 54, position control valve 48 to pass warm water through pipes 40 and 42 to the circulating pump 43 which discharges through pipe 44 to unit. Return water leaves the unit, cooler than entering through pipe to its source, hot storage tank 57. A temperature regulating control TR (FIG. 1), with its sensing element the supply water flow pipe 44, serves as a limit control and modulates control valves 48 and 45 to mix hot and cold water, as needed, to maintain entering water within the range of 45° F. to 100° F. When mixed flow occurs control valves 45 and 48 automatically proportion the flow to and from each tank such that neither tank is depleted below its normal water volume. The heat then is transferred by the heat pump 1 from its water coil to its air coil and is dissipated into the building return air and is delivered by the unit-blower to the building supply air duct system. The warm air from the supply air duct supply system flows through the zone dampers 2 (if used) or into the floor, wall and ceiling air passages to heat the various spaces within the building. Zone dampers 2 are under control of their respective zone thermostats 55 and vary the air flow rate in accordance with the needs of the zone spaces. The zone dampers 2 are equipped with end switches (wired in parrallel) which stops the unit blower when all zones are satisfied. Change over of the system is initiated by indexing the master thermostat 56 to cooling. Damper control relays, not shown, located within the system control panel 54 automatically reverse the action of the zone thermostats 55.

In the cooling mode, control valves 48 and 45 are positioned to pass cold water from hot/cold storage tank 58 through pipes 50, 42, 44 and circulating pump 49 to the source. In this mode the refrigerant circuit in the heat pump unit 1 is reversed to extract heat from the house return air flow, by means of its air coil, and reject the heat thus extracted (along with the heat equivalent of compressor work) to its water coil. Return water thus leaves the unit through control valve 45 and pipe 49 at a temperature warmer than its entering condition and is returned to its source, hot/cold storage tank 58.

Both the hot storage tank 57 and the hot/cold storage tank 58 are provided with identical piping and duct connections and heat exchangers except that the hot tank only will be provided with domestic water heating coils 95 and surge tank 98. The tanks 57 and 58 are sized to provide the required volume of water for thermal energy storage and the required heat exchanger surface area for the heat transfer processes. Tank walls, bottom and top 46 are constructed of corrosion resistant material such as wood, metal or plastic lining with a service temperature rating of 212° F. or greater. The tanks are provided with overflow traps equipped with automatic trap primers to maintain the fill level within the prescribed limits. The heat exchanger float 90 serves to maintain a constant discharge static pressure on the solar fan 33 and more importantly insures that the coolant flow is at all times in intimate contact with the stored water. Since there are no intervening barriers, the heat transfer rate is maximized.

Domestic water heating is accomplished by introducing cold domestic water to the bottom of the surge tank 98 thru its inlet tube 93. Since the surge tank is submerged in a tank of hot water the supply is pre-heated and leaves the surge tank through its outlet tube 94 to the domestic water heating coils 95 that are recessed in oversize grooves on the bottom surface of the heat exchanger float 90. Hot water leaves the heat exchanger through tube 96 from whence it flows to the building storage type domestic water heater (back-up unit). Since the domestic hot water coils are floated on the top surface of the the stored hot water and are also located in the flow path of the hot moist air, the heat transfer rate to the coils is maximized. Air flowing across the top surface of the hot stored water creates circulation within the body of hot water, as shown in FIG. 8, to prevent thermal stratification.

Obviously, many modifications and variations of the present invention are possible in the light of the foregoing teachings. It is therefore to be understood that within the scope of the appended claims, the invention may be practiced otherwise than as specifically described.

What is claimed as new and desired to be secured by Letters Patent of the United States is:

1. For use in a building structure heating system utilizing solar energy and including a solar energy collector, duct means for carrying heated circulatory fluid in the form of moist air to a heat storage tank, and duct means for returning cooled circulatory fluid in the form of moist air from said heat storage tank to said solar energy collector, a fog nozzle-spray pump assembly incorporated in said duct means for returning cooled circulatory fluid in the form of moist air from said heat storage tank to said solar energy collector operable to spray water into said flow of moist air returning from said heat storage tank to said solar energy collector to change the same into a mixture of saturated air and liquid water in the form of a fog.

2. An improved heat transfer means comprising: an air type solar energy collector means; and inlet duct means operatively associated with said collector; and outlet duct means operatively associated with said collector; means for forcing air to flow through said inlet duct means, said collector, and said outlet duct means; remote heat exchange means operatively associated with said outlet duct means remote from said collector; and means for injecting an aerosol into said collector adjacent said inlet duct whereby said aerosol will collect heat during vaporization within said collector, transfer said heat through said outlet duct and will give up said heat within said remote heat exchange means during condensation; and means for recycling the condensed transfer medium from said storage means back to said aerosol injector means.

* * * * *